US006205463B1

(12) United States Patent
Manglore et al.

(10) Patent No.: US 6,205,463 B1
(45) **Date of Patent: *Mar. 20, 2001**

(54) FAST 2-INPUT 32-BIT DOMINO ADDER

(75) Inventors: Rajesh Manglore, Santa Clara; Sudarshan Kumar, Fremont, both of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/850,989

(22) Filed: May 5, 1997

(51) Int. Cl.[7] .......... G06F 7/50

(52) U.S. Cl. .......... 708/710; 708/711; 708/712

(58) Field of Search .......... 364/788, 787, 364/746, 786; 708/710, 711, 712

(56) References Cited

U.S. PATENT DOCUMENTS 4,157,590 * 6/1979 Grice et al. .......... 708/710
4,348,736 * 9/1982 Weinberger .......... 708/710
4,425,623 * 1/1984 Russell .......... 708/703
4,737,926 * 4/1988 Vo et al. .......... 708/711
4,764,888 * 8/1988 Holden et al. .......... 708/714
4,905,180 * 2/1990 Kumar .......... 708/712
5,257,218 * 10/1993 Poon .......... 708/712
5,276,635 * 1/1994 Naini et al. .......... 708/713
5,278,783 * 1/1994 Edmondson .......... 708/711
5,337,269 * 8/1994 McMahan et al. .......... 708/711
5,375,081 * 12/1994 Anderson .......... 708/712
5,471,414 * 11/1995 Kumar et al. .......... 708/714
5,477,480 * 12/1995 Inui .......... 708/711
5,511,017 * 4/1996 Cohen et al. .......... 708/491
5,579,254 * 11/1996 Kumar et al. .......... 708/714
5,581,497 * 12/1996 Kumar .......... 708/711

* cited by examiner

*Primary Examiner*—Thomas C. Lee
*Assistant Examiner*—NguyênNguyên
(74) *Attorney, Agent, or Firm*—Blakely, Sokoloff, Taylor & Zafman LLP

(57) ABSTRACT

In one embodiment, an adder is sectioned into a plurality of operational blocks; namely, a first block, second block, and third block. The first block in a first section generates sum bits and a section carry signal. The second block in the second section generates a second plurality of sum bits and a first block carry signal. A third block in the second section receives both the section carry signal and the first block carry signal. The third block includes a carry processor which receives the section carry signal and outputs a second block carry signal corresponding to the third block.

18 Claims, 10 Drawing Sheets

TO FIG. 4C
442
438
434
CLK
TO FIG. 4D 448
446
TO FIG. 4E
X0 306
Y0 308
X1 310
Y1 312
X2 314
Y2 316
X3 318
Y3 320
FROM FIG. 4B

FAST 2-INPUT 32-BIT DOMINO ADDER

BACKGROUND OF THE INVENTION

1. Field of the Invention

The invention relates to the field of digital (binary) adders, particularly those employing carry look-ahead.

2. Description of Related Art

Fundamental to the operation of virtually all digital microprocessors is the function of digital (i.e., binary) addition. Addition is used not only to provide numerical sums, but also in the implementation of numerous logic functions. In a typical microprocessor, many adders are used for these functions. When two digital words are added, the carry bit that results from the addition of lesser significant bits must be considered. This can easily be done by rippling a carry signal through the entire addition chain as the addition is performed. A problem with this, particularly for relatively large words (e.g., 32 bits) is that substantial time is required to ripple the carry signal. Since adders are often performing logic functions in critical time paths, the time needed to ripple the carry signal can slow up the microprocessor. This problem is dealt with in the prior art with carry look-ahead circuits, skip-carry circuits and with different partitioning of group circuitry. These circuits are discussed in U.S. Pat. No. 4,737,926.

Thus, what is needed is an improved adder that has fewer delays along critical paths in the adder and provides substantial improvement in terms of speed of operation when compared to prior art adders.

SUMMARY OF THE INVENTION

In one embodiment, an adder comprises a first block, a second block, and a third block. The first block in a first section generates sum bits and a section carry signal. The second block in the second section generates a second plurality of sum bits and a first block carry signal. A third block in the second section receives the section carry signal and the first block carry signal. The third block includes a carry processor which receives the section carry signal and outputs a second block carry signal corresponding to the third block.

DETAILED DESCRIPTION OF THE INVENTION

In the following description a novel high speed adder is described. Included in the description are numerous specific details such as specific circuits (e.g., specific gates and transistor diagrams) in order to provide a thorough understanding of the present invention. However, it will be understood by those skilled in the art that the present invention may be practiced without these specific details. In other instances, well known methods, procedures, components and circuits have not been described in detail so as not to obscure the present invention.

Figure 1:
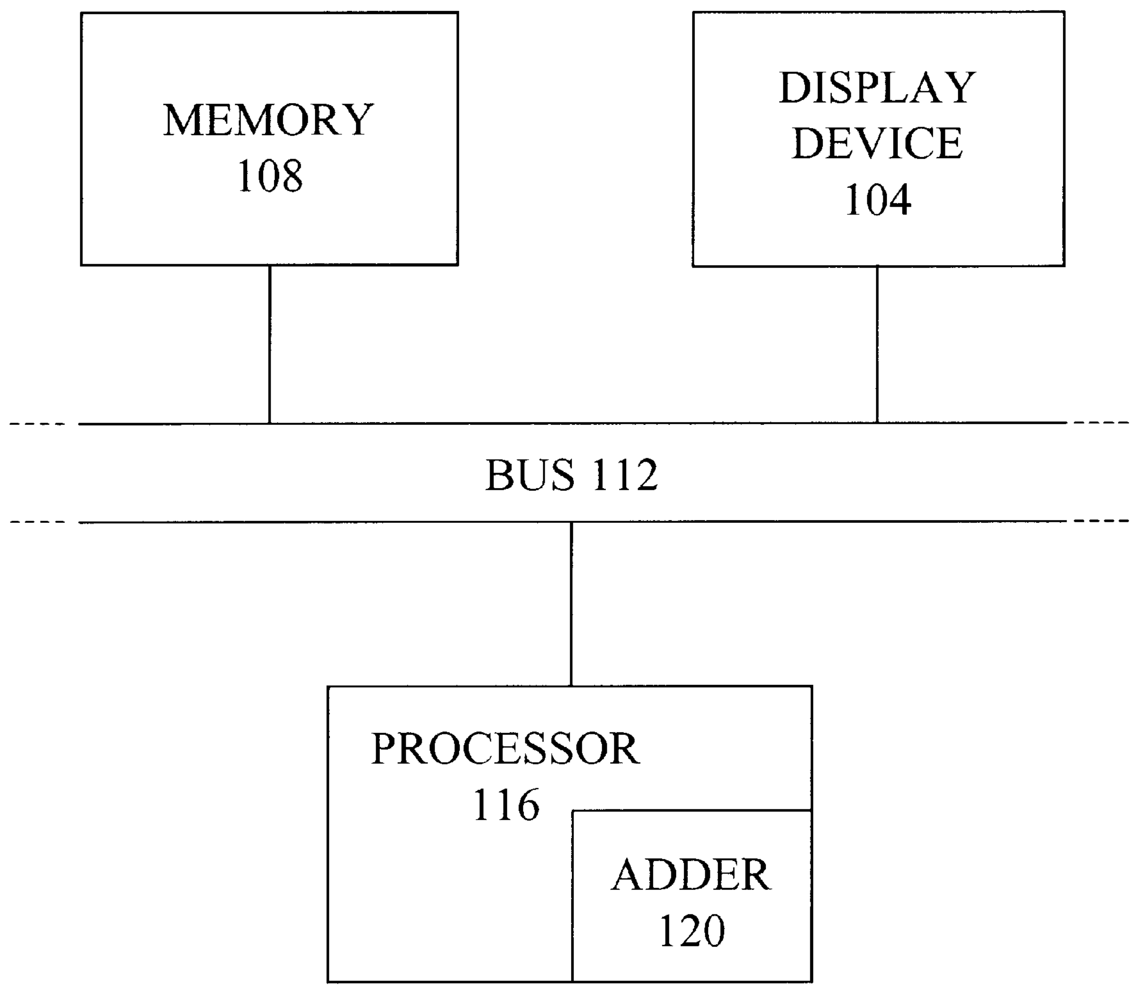
FIG. 1 illustrates in block diagram form one embodiment of the computer system of the present invention including an adder.

FIG. 1 illustrates in block diagram form the computer system of one embodiment of the present invention. Computer system 100 includes a display device 104, memory 108, a bus 112 and a processor 116. Display device 104 can be a television set, a computer monitor, a flat display, panel display or other display device. Memory 108 can be random access memory (RAM) or other semiconductor memory. Bus 112 can be a processor/host bus, a system bus, an Industry Standard Architecture (ISA), Extended Industry Standard Architecture (EISA), Peripheral Component Interconnect (PCI) or other bus architecture. Processor 116 can be a complex instruction set computing (CISC) microprocessor, reduced instruction set computing (RISC) microprocessor or any other type of microprocessor. Processor 116 includes an adder 120. In one embodiment, adder 120 is a fast two-input domino adder. For illustrative purposes, adder 120 will be described as a two input 32 bit domino adder. The delay through adder 120 can be less than 1 nanosecond enabling the adder chip to run at frequencies greater than 300 megahertz. The high speed is due to a number of factors including the use of high-fan in domino circuits, the parallel generation of sum output and carry bits, and a short critical path length.

Figure 2:
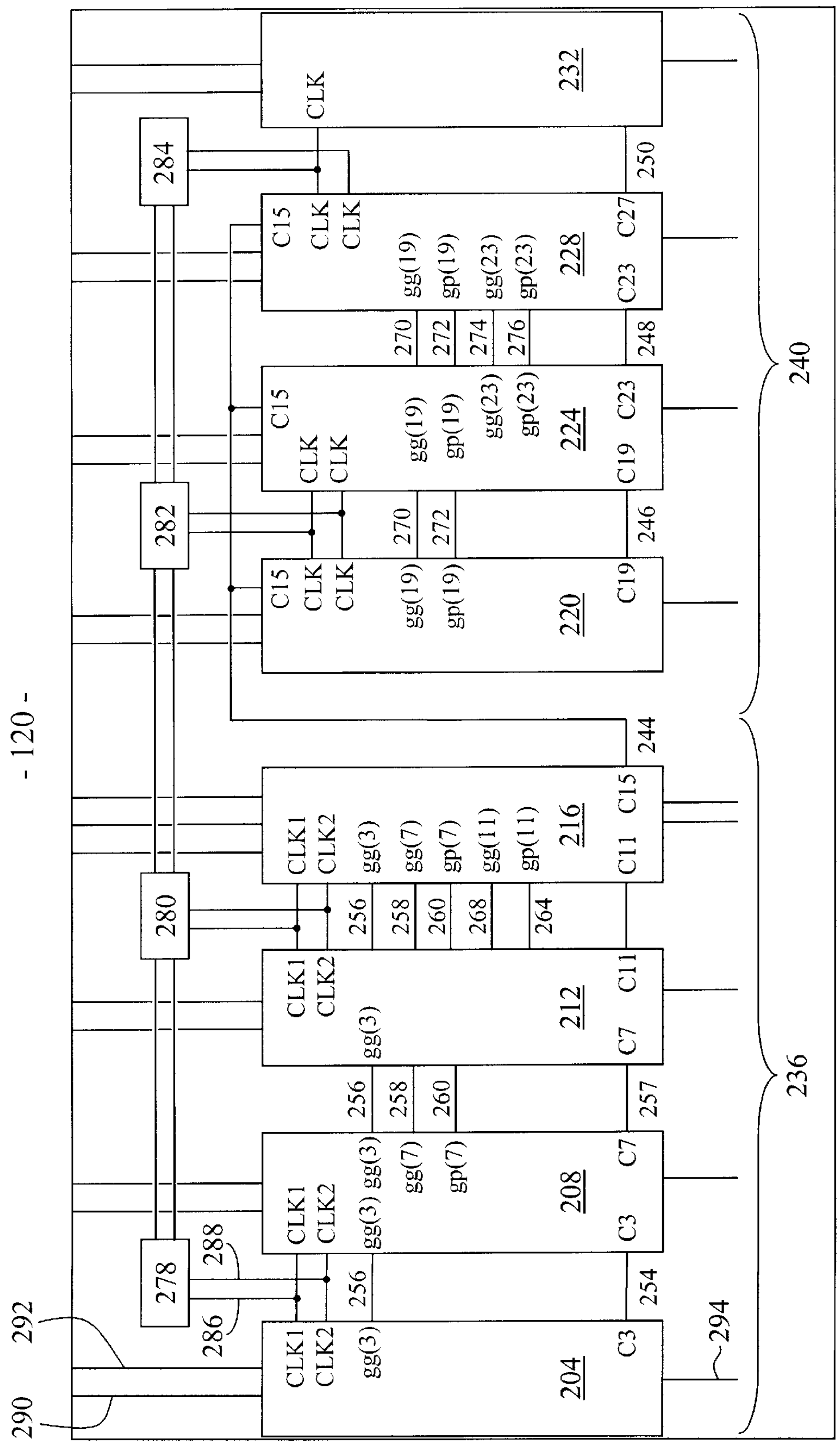
FIG. 2 illustrates in block diagram form an adder in one embodiment of the present invention.

FIG. 2 illustrates in block diagram form an embodiment of the adder 120 of the present invention. The particular adder shown is designed to add two 32-bit binary numbers, although in alternate embodiments the adder can be reconfigured to add binary numbers having "n" bits ("n" being the number of bits in each number being added). For example, the design illustrated may be modified to add two 64 bit binary numbers.

The adder 120 is made up of eight circuit blocks 204, 208, 212, 216, 220, 224, 228 and 232 (hereinafter "blocks"). The blocks 204, 208, 212, 216, 220, 224, 228, 232 in the pictured embodiment are designed such that each block combines or sums a four bit segment from a first 32 bit number with a corresponding four bit segment from a second 32 bit number to generate four sum bits and an appropriate carry signal resulting from the 4-bit addition. In the embodiment shown, the blocks which process the less significant 16 bits are categorized as blocks 204, 208, 212, 216 in a lower half or first section 236. Upper half blocks or the second section 240 includes blocks 220, 224, 228, 232 which process the more significant 16 bits of the two 32 bit number being added. As will be shown, dividing the adder 120 into sections (two halves 236, 240 in the embodiment shown although other division are also allowable) and appropriately processing the carry improves the speed of the adder. A first section carry (c15) 244 from the most significant bit in the first section 236 propagates to blocks 220, 224, 228 in the second section 240. The first section carry (c15) 244 is directly used to generate block carry signals 246, 248, 252 for blocks 220, 224, 228 in the second section 240. The first section carry 244 is the block carry for a block in the first section, usually the block which processes the most significant bits of the first section.

In addition to the transmission of carry signals, blocks also generate and transmit group generate and group propagate signals. For example, a first block 204 transmits a block carry (c3) 254 and a block group generate signal (gg3) 256 corresponding to the first block to second block 208. The group generate signal 256 corresponding to the first block 204 is also transmitted to the third block 212 as identified through similar reference labeling. The second block 208 generates and transmits a block carry signal (c7) 257, a group generate (gg7) 258 and a group propagate (gp7) 260 signal, all corresponding to the second block 208. The fourth block 216 receives all group generates, and group propagate signals output by the first block 204 and the second block 208 as well as block carry, group propagate 264 and group generate 268 signals generated by and corresponding to the third block 212.

The second section 240 (an upper half in the pictured embodiment) of adder 120 includes blocks 220, 224, 228 and 232. Blocks in the second section 240 which generate a block carry directly receive a section carry 244 from the first section 236. In the illustrated embodiment, the section carry is the block carry (c15) from the fourth block 216. In most embodiments, the section carry will be the block carry from the block processing the most significant bits in a section.

In addition to directly receiving the section carry 244 from the first section 236, intermediate blocks in the second section 240 receive carry signals, group generate signals and group propagate signals from preceding blocks within the same second section 240. Intermediate blocks are blocks which do not process the most significant bits nor the least significant bits in a section. Blocks which compute more significant sum bits receive group generates and group propagates from preceding blocks which generate less significant sum bits as well as a carry signal from the immediate preceding block. For example, fifth block 220 transmits a block carry (c19) 246, a group generate signal (gg19) 270 and a group propagates signal (gp19) 272 to sixth block 224. The group generate signal (gg19) 270 and the group propagate signal (gp19) 272 are also transmitted to sixth block 224. Sixth block 224 generates and transmits the block carry (c23) 248 along with group generates (gg23) 274 and group propagates (gp23) 276 to seventh block 228. As will be described, the seventh block uses the group generates and group propagates from the fifth and sixth blocks to generate the block carry (c27) 250 for the eighth block 232.

In the embodiment shown, clock chips 278, 280, 282 and 284 provide timing signals for adder 120. Each clock chip provides timing signals for two blocks in adder 120. For example, clock chip 278 provides timing signals for first block 204 and second block 208 via lines 286 and 288.

In the pictured embodiment, each block is designed to generate a four bit sum. For example, block 204 is designed to handle 4 bits from a first 32-bit number on liner 290 and four bits from a second 32-bit number on line 292. Block 204 outputs the four sum bits on line 294. However, block sizes can be changed. For example, block 204 can be modified to handle the combination of two 8-bit segments of a 64-bit number. Furthermore, in alternate embodiments, section division into an upper half and a lower half can also be changed. In one embodiment, a 64-bit adder utilizing four 16 bit sections may be implemented using many of the designs disclosed in this invention.

Figure 3:
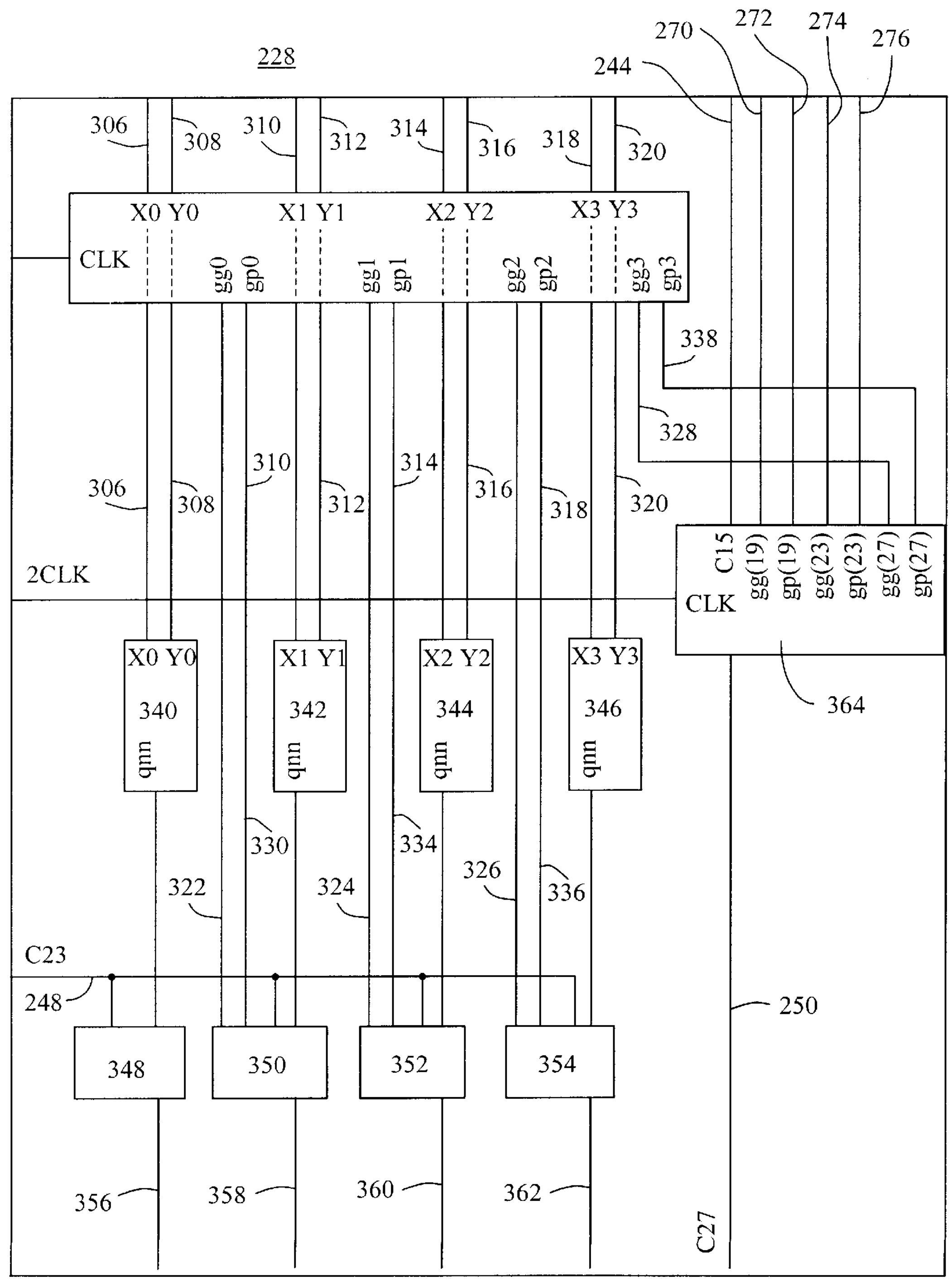
FIG. 3 illustrates in block diagram form a block in the adder shown in FIG. 2.

FIG. 3 is a block diagram illustrating one implementation of a seventh block 228 in the second section 240 of FIG. 2. In the embodiment shown, block 228 includes a carry look-ahead unit 304 which receives the 23rd, 25th, and 26th bits of two 32 bit binary numbers being added. The twenty-third bit of a first number being added and the twenty-third bit of a second number being added arrive on lines 306 and 308, respectively. The twenty-fourth bits of the numbers being added are received on lines 310 and 312. The twenty-fifth bits are received on lines 314 and 316 and the twenty-sixth bits are received on lines 318 and 320. These inputs are received by the carry look-ahead 304 which generates the appropriate group generate and group propagate signals. The group generate signals are output on lines 322, 324, 326 and 328 and the group propagate signals are output on lines 330, 334, 336, and 338 respectively.

Each bit summer 340, 342, 344 and 346 receives two bits, one bit from each number being added. The bit summers add the two bits and output a result to respective sum selectors 348, 350, 352 and 354. The first sum selector 348 of the seventh block selects the sum 356 of the two least significant bits of the block based on the block carry (c19) from the immediate preceding block, the sixth block 224 in the example shown. Other sum selectors 350, 352 and 354 in block 228 receive the output of bit summers 342, 344 and 346 respectively. Each of these other sum selectors 350, 352, 354 computes two sets of sums using one group propagate signal 330, 334, 336, one group generate signal 322, 324, 326, and a bit summer 342, 344, 346 output. Then the block carry (c19) 356 from the immediately preceding block 224 is used to select a corresponding sum signal output on respective output lines 358, 360 and 362.

While the sum selectors 348, 350, 352, 354 generate an appropriate sum signal, a carry processor 364 in block 228 computes the block carry 250 for the block 228. For the illustrated seventh block, the block carry is (c27) 250. Carry processor 364 receives a section carry 244 from the first section 236 of the adder 120. The carry processor 364 also receives section carry 244, group generates and group propagates from preceding blocks in the second section, as well as a group generate and a group propagate from the carry look ahead 304. Carry processor 304 uses the inputs to generate a block carry (c27) 250 for the seventh block. In the illustrated embodiment, carry processor 364 receives the group generates (gg19) 270 and group propagates (gp19) 272 signals from the fifth block 220, the group generate (gg23) 274 and group propagate (gp23) 276 signal from the sixth block, the group generate (gg27) 328 and the group propagate (gp27) 338 from the carry look ahead circuit 304, and the section carry (c15) 244 to generate and output a block carry (c27) 250 corresponding to the seventh block. The block carry (c27) 250 is output to the eighth block 232.

The design of block 228 is particularly fast partly because of significant parallel computation. For example, the bit summers 340, 342, 344, 346 operate in parallel with the carry-look ahead 304 circuit to generate the input for sum selectors 348, 350, 352, 354. In addition, the sum selectors 348, 350, 352, and 354 operate in parallel with the carry processor 364 allowing the block carry to be generated while the sums are generated. In one embodiment, domino circuits are used in the look-ahead circuit 304 and the carry processor 364. The parallel computations and the use of domino circuits keep delays through the adder 120 below one nano second enabling clock speeds exceeding 300 MHz.

Figure 4A:
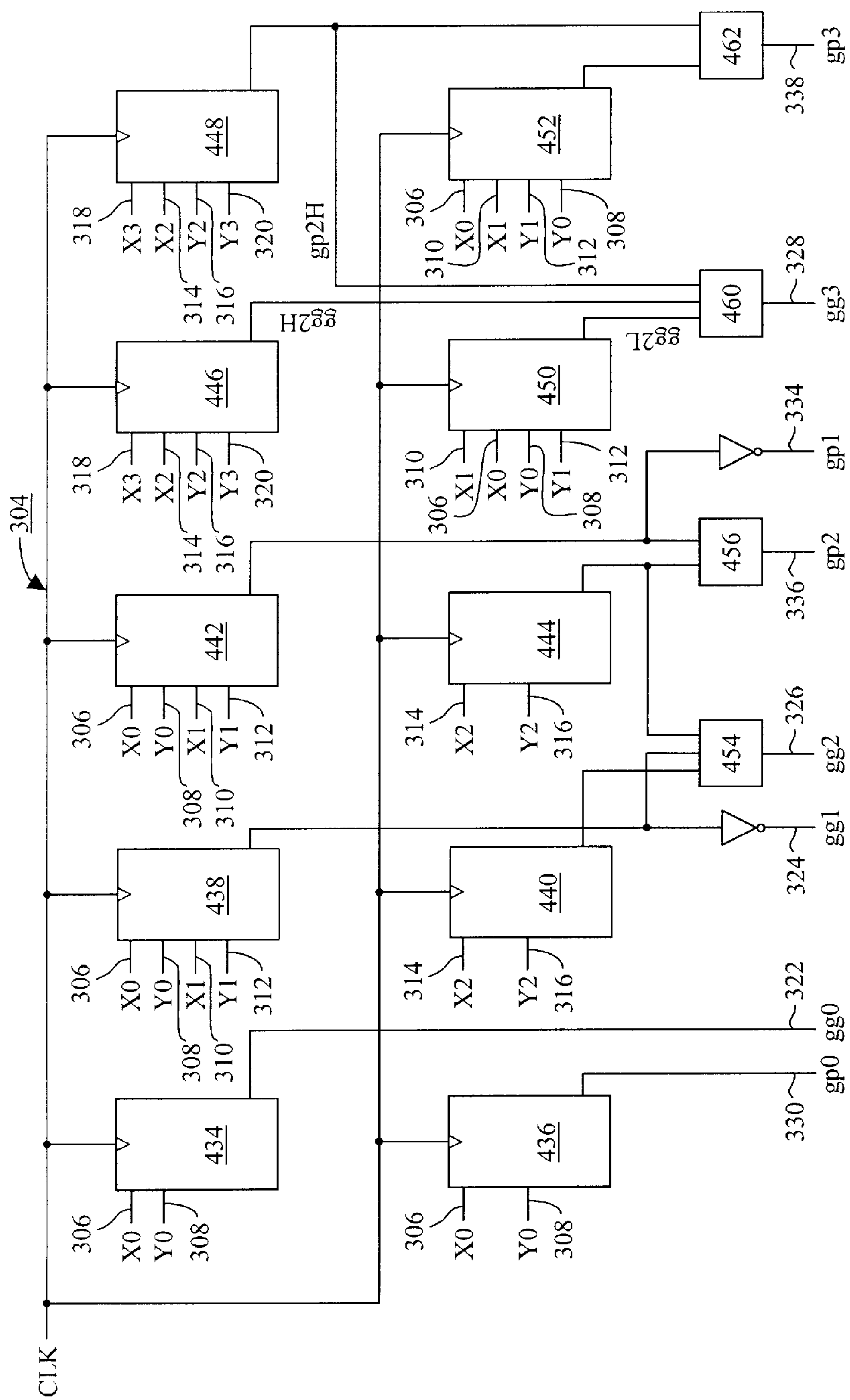
FIG. 4A illustrates, in block diagram form, the carry look-ahead circuit of the block shown in FIGS. 3.
Figure 4B:
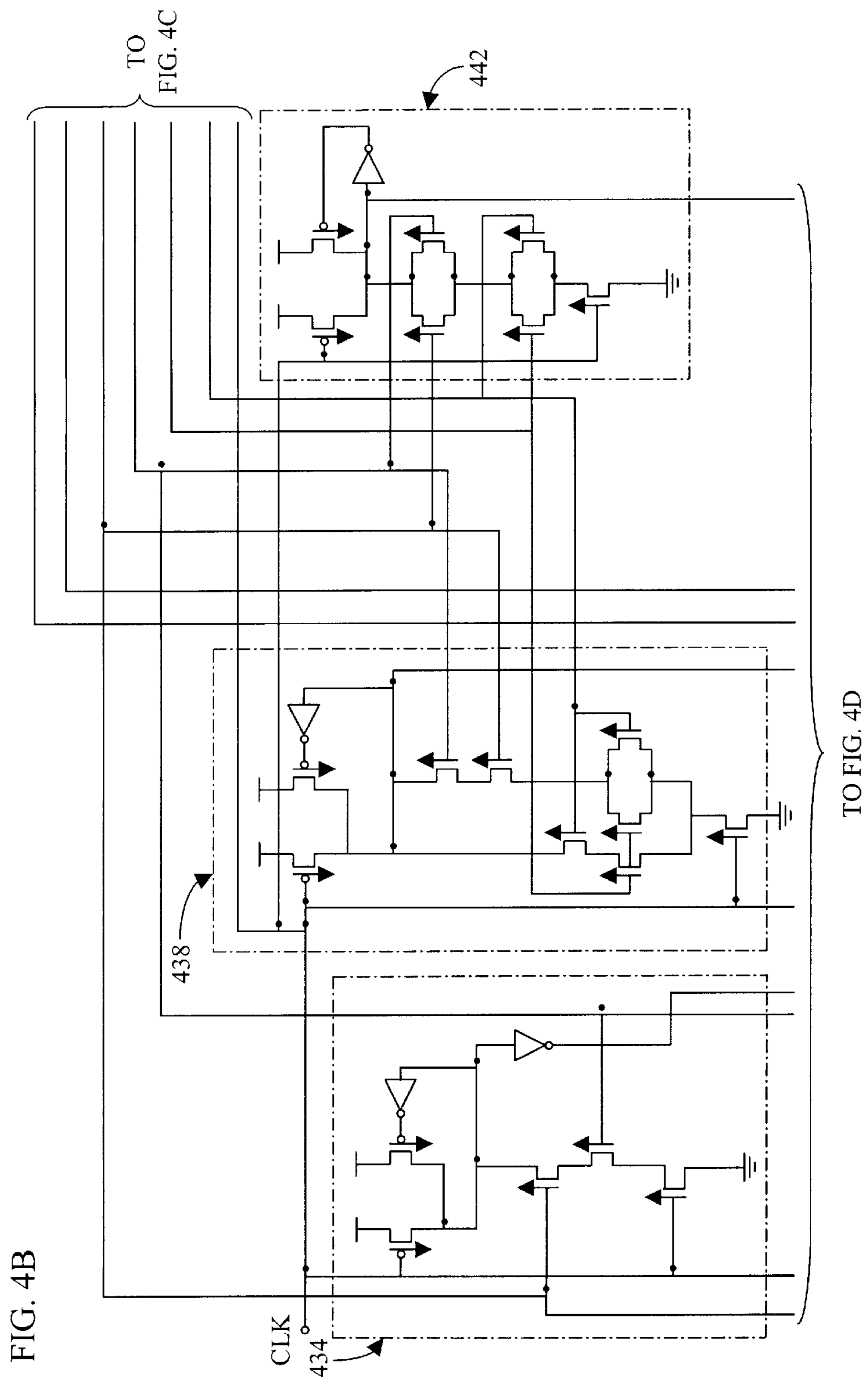
FIGS. 4B–4E illustrate at a transistor level the same carry look-ahead circuit.
Figure 4C:
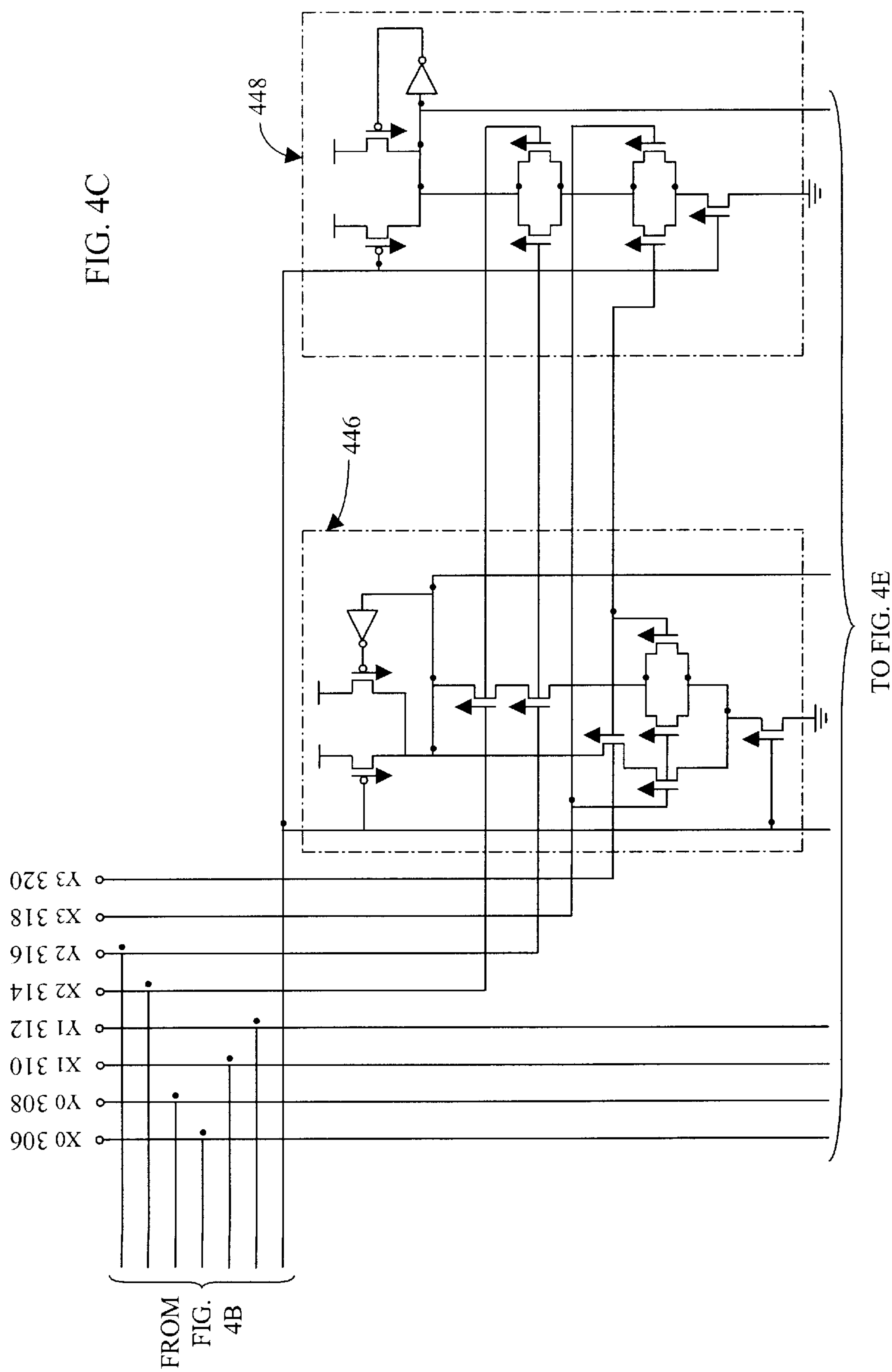
Figure 4D:
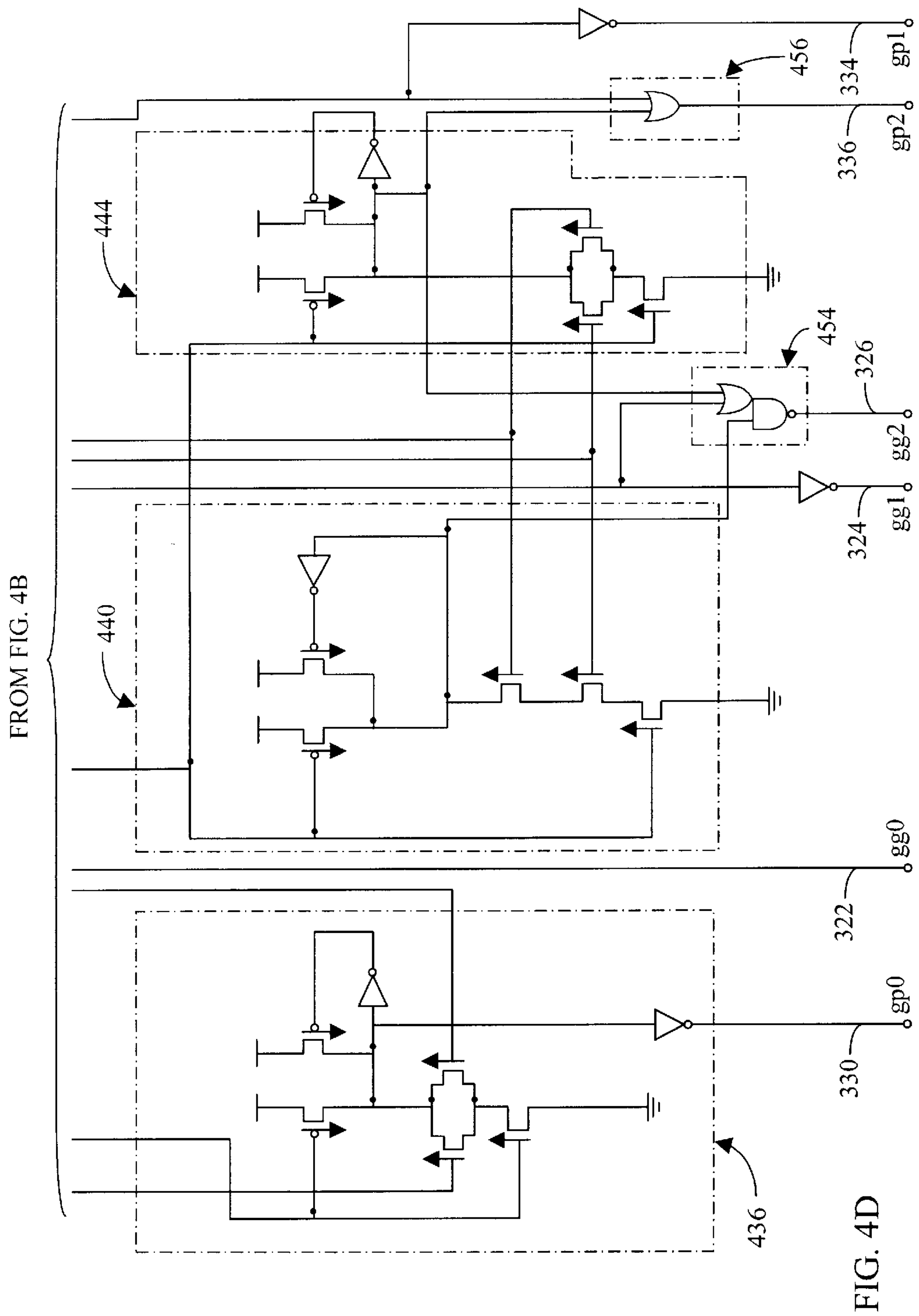
Figure 4E:
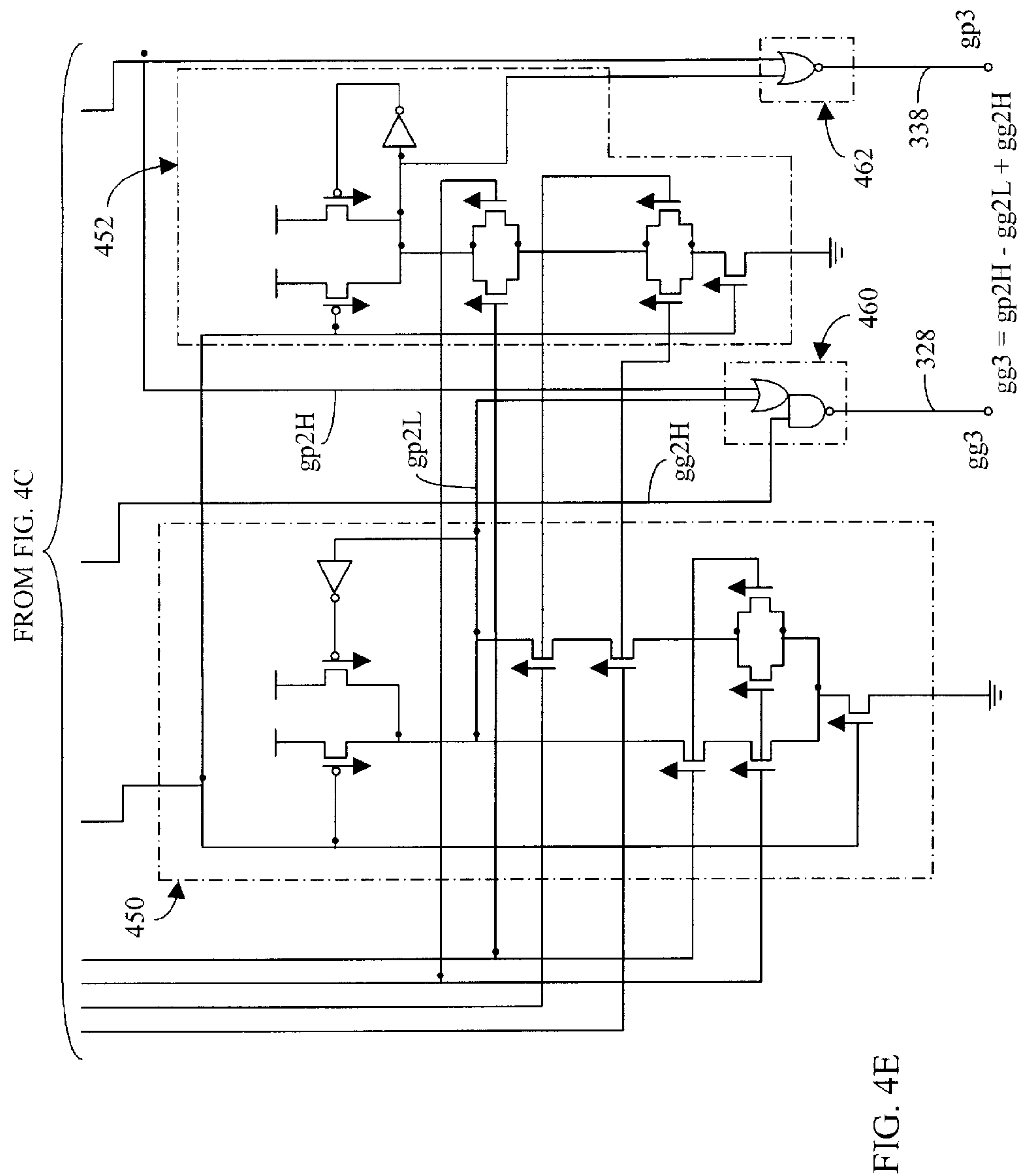

FIGS. 4A–E illustrates a block level and a transistor level diagram of the carry look-ahead 304 shown in FIG. 3. A block level diagram is illustrated in FIG. 4A while a transistor level implementation is illustrated in FIGS. 4B–4E. One skilled in the art would be familiar with the operation of the units shown in FIGS. 4B–4E. As described, the adder has been divided into a plurality of sections. Each block must thus accommodate a number of inputs. One method of accommodating the large number of inputs is by using high fan-in domino circuits which have traditionally been used for reducing multiple load devices by using multiple clocks. Domino circuits help solve the problem of erroneous states caused by cascading logic gates. A transistor implementation of a domino circuit carry look-ahead is shown in FIGS. 4B–4E.

The illustrated carry look-ahead 304 receives a bit segments from each number being added. The least significant bit (X0,Y0) of each segment of an addend being added are input into lines 306 and 308. The next least significant bits (Y1,Y1) are input into lines 310 and 312. The two more significant bits (X3, Y3) are input into lines 314 and 316 while the two most significant bits (X4, Y4) are input into line 318 and 320.

The carry look-ahead 304 shown in FIGS. 4A–E is comprised of a plurality of domino circuits which compute the group propagates and the group generates for the sum selectors 350, 352, 354 and the carry processor 364. The group propagates are output on lines 330, 334, 336 and 338 respectively. Group generates are also generated on lines 332, 324, 326 and 328. The group generates and group propagates are computed by combining using combinatorial logic 454, 456, 458, 460, 462 the outputs of domino stages 434, 436, 438, 440, 442, 444, 446, 448, 450, 452. A domino stage or domino gate is a logic gate which utilizes multiple clocks and typically uses a complementary metal oxide semiconductor (CMOS) inverter at the output of the logic gate.

By way of example, domino state 446 is designed to produce an intermediate group generate (gg2h) using the inputs bits 314, 316, 318, 320 (X2, Y2, X3, Y3) in block 228. Domino stage 450 generates a second intermediate group generate signal (gg2L) using four least significant bits (X0, Y0, X1, Y1) while domino stage 448 is designed to generate an intermediate group propagate signal (gp2h) using inputs X2, Y2, X3, Y3. The third group generate signal (gg3) 328 can be computed by combining the outputs of these domino stages according to the equation gg3=gg2L·gp2H+gg2H. The combining of the signals may be performed by combinatorial logic 460.

From the transistor circuits shown in FIGS. 4B–4E the generation of the remaining group generate and group propagate signals is shown. The carry look-ahead 304 illustrated requires an incoming signal to pass through only one domino stage and at most two combinatorial logic gates to generate any group generate or group propagate signals. Thus the carry look-ahead adder pictured is one embodiment because it generates group generates and group propagates extremely quickly.

Figure 5:
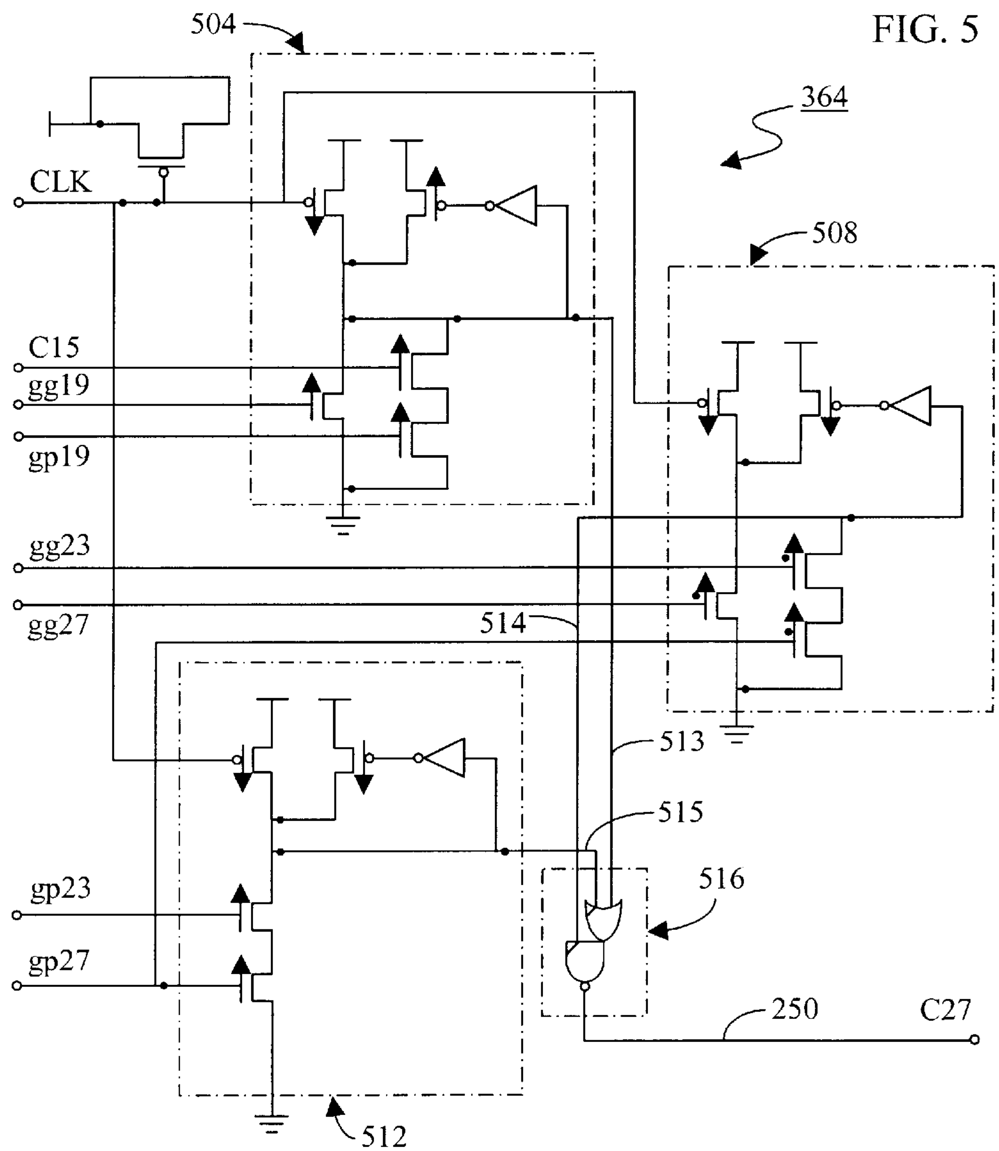
FIG. 5 illustrates at a transistor level the carry processing circuit which generates the carry for the block illustrated in FIG. 3.

FIG. 5 illustrates a transistor implementation of one embodiment of the carry processor 364 used by the seventh block 228. The carry processor 364 includes a first domino stage 504, a second domino stage 508 and a third domino stage 512. The first domino stage 504 receives a first section carry (c15) 244 from the first section 236 of the adder 120. The section carry 244 is combined with the group generate signal (gg19) and group propagate signal (gp19) from the fifth block 220 (first block of the second section) to produce an intermediate carry 513. The intermediate carry 513 is logically equivalent to the block carry of the fifth block 246 but is independently generated within the carry processor 364. Independent generation increases the speed of the adder 120 by allowing parallel computation of the block carry bits for the fifth block 220 and the seventh block 228. The transistor design of the carry processor of block 220 in adder 120 is very similar to domino stage 504 of the illustrated carry processor 304.

The second domino stage 508 of carry processor 364 receives the group generate signal (gg23) from the sixth block 224 as well as a group generate signal (gg27) from the carry look-ahead 304 to produce an intermediate group generate 514. The third domino stage 512 of carry processor 364 receives the group propagate signal (gp23) from the sixth block 224 as well as a group propagate (gp27) from the carry look-ahead 304 to produce an intermediate group propagate. Combinatorial logic 516 combines the signals 513, 514, 515 to generate a final carry signal (c27) 250 corresponding to the seventh block 228.

Figure 6:
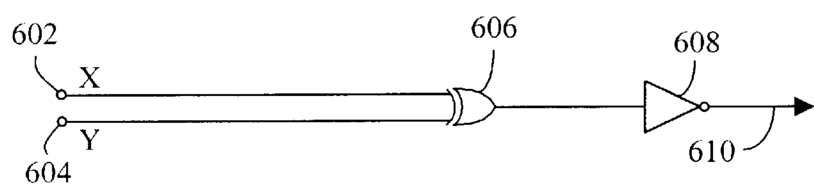
FIG. 6 illustrates at a gate level the bit summers used in the block shown in FIG. 3.

FIG. 6 illustrates a logic gate implementation of a bit summer. The bit summer shown in FIG. 6 receives two bits on lines 602 and 604, one bit from each of the two numbers being added. In one embodiment, an exclusive OR-gate 606 combines the two bits 602, 604 being added to generate a sum. In one embodiment, the sum is inverted by an inverter 608 before being output on line 610 to one sum selector e.g., sum selector 348.

Figure 7:
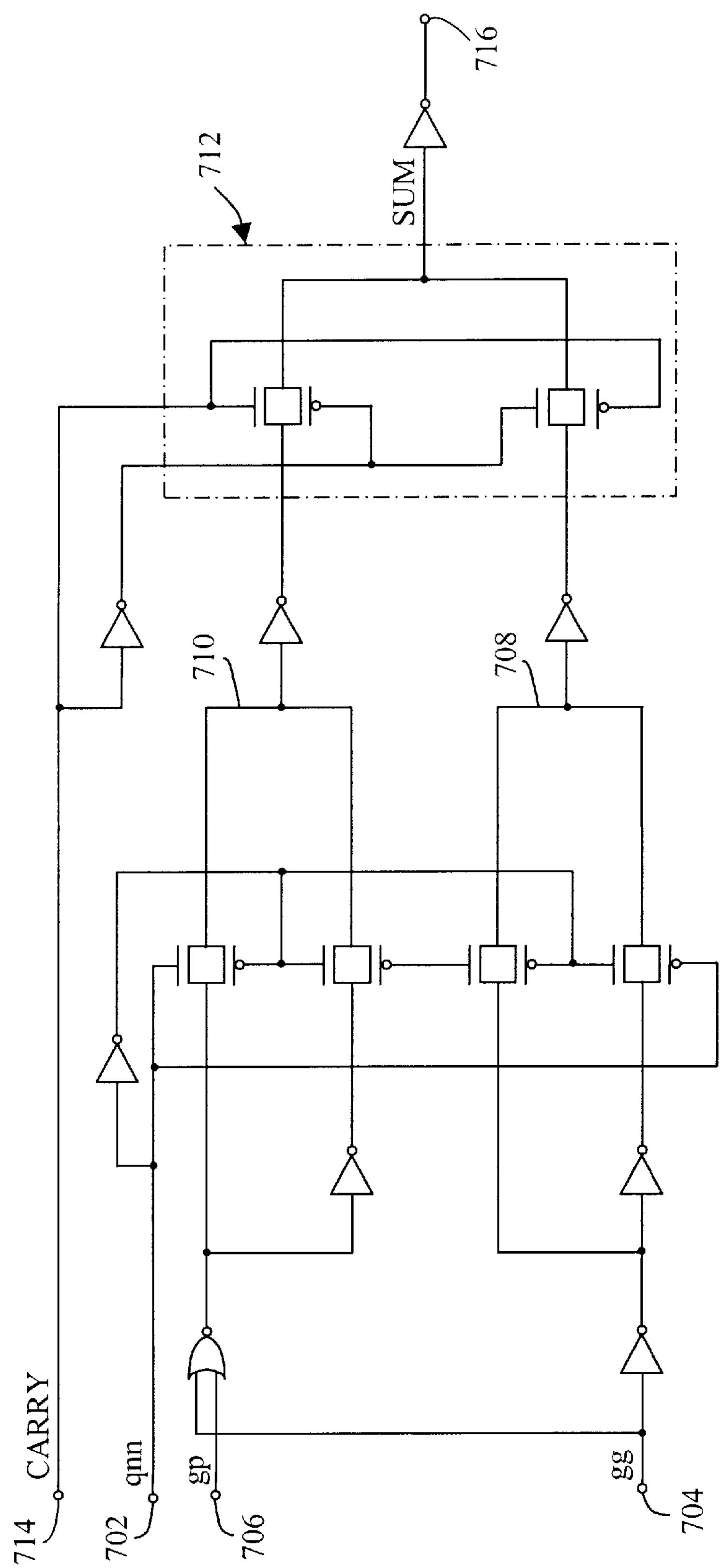
FIG. 7 illustrates at a transistor level the sum selectors used in the block illustrated in FIG. 3.

FIG. 7 illustrates in gate form one of the sum selectors 350 used in the seventh block 228. In the embodiment shown, the sum selector receives the output of a bit summer 342 on line 702. The carry look-ahead 304 outputs a group generate signal 704 and the group propagate signal 706 to the sum selector. The appropriate sum signal if the first carry from the preceding block is zero is transmitted to node 708. The sum that is output if the carry from the preceding block is one is transmitted to node 710.

A multiplexer 712 selects the appropriate sum from the nodes 708, 710 depending on whether the block carry 714 from the preceding block is asserted or deasserted. The multiplexer's output on line 716 is the output of the sum selector 350 in FIG. 3. The output of the sum selector 350 represents the sum of the two bits being added at the bit adder 342 taking into account the block carry 714 signal from the preceding block.

What is claimed is:

1. An adder comprising:

a first block in a first half of the adder to generate at least two sum bits and a section carry signal, the at least two sum bits and the section carry signal being generated in parallel;

a second block in a second half of the adder to generate at least two additional sum bits, a corresponding block carry signal and corresponding group generate and group propagate signals of the block; and a third block in the second half of the adder to receive the section carry signal and the corresponding block carry signal, the third block including (i) a carry processor to process the section carry signal and to output a second block carry signal corresponding to the third block, and (ii) a sum selector to generate a sum bit from the corresponding group generate and group propagate signals, the second block carry signal and the sum bit being generated in parallel.

2. The adder of claim 1, wherein the third block further comprising a first plurality of sum selectors including the sum selector, each sum selector of the first plurality of sum selectors to directly receive the second block carry signal, each sum selector using the second block carry signal to generate sum bit outputs.

3. The adder of claim 2 further comprising:

a fourth block in the second section including a second plurality of sum selectors, each sum selector of the second plurality of sum selectors including a multiplexer to select a sum bit based on the second block carry signal.

4. The adder of claim 2 wherein the third block further comprises:

a carry look-ahead circuit to generate a group propagate and a group generate signals for input into each sum selector in the first plurality of sum selectors.

5. The adder of claim 4 further comprising bit summers to output the sum of two bits being added for input into the sum selector.

6. The adder of claim 5 wherein the bit summers and the carry look-ahead circuit operate in parallel.

7. The adder of claim 2 wherein the sum selectors and the carry processor operate in parallel.

8. The adder of claim 1 wherein each block produces four sum bits and the section carry signal is a block carry signal from a block which processes the most significant bits being added in the first section of the adder.

9. The adder of claim 1 wherein said carry processor further comprising:

a domino stage to receive the section carry signal and to generate an intermediate carry; and a combinatorial logic to process the intermediate carry.

10. Implemented in a section of an adder including a plurality of circuit blocks, a circuit block comprising:

a first sum selector to receive a first group generate signal, a first group propagate signal, and a block carry signal to generate a first sum bit;

a second sum selector to receive a second group generate signal, a second group propagate signal and the block carry signal to generate a second sum bit, the second sum selector operating in parallel with the first sum selector; and a carry processor to receive a section carry signal and group generate and group propagate signals from at least two of the plurality of circuit blocks in the section other than the circuit block, the carry processor to compute a carry for the circuit block, the carry processor to operate in parallel with the first sum selector and the second sum selector.

11. The circuit block of claim 10 further comprising:

a third sum selector which receives a third group generate signal, a third group propagate signal and the block carry signal to generate a third sum bit, the third sum selector to operate in parallel with the first sum selector.

12. The circuit block in claim 10, wherein the carry processor further comprises:

a plurality of domino stages, each domino stage generating an intermediate carry; and a combinatorial logic stage to combine intermediate carries to generate a group carry.

13. The circuit block of claim 10 wherein the sum selector includes a multiplexer to select an output based on the block carry signal from an immediately preceding circuit block.

14. A method of adding two binary numbers comprising:

generating at least two sum bits and a section carry signal, the at least two sum bits and the section carry signal being generated in parallel;

generating at least two additional sum bits, a block carry signal, a group generate and group propagate signals;

receiving the block carry signal and the section carry signal; and generating a second block carry signal corresponding to the third block using the section carry signal.

15. The method of claim 14 further comprising generating a plurality of sum bit outputs using the second block carry signal.

16. The method of claim 15 further comprising selecting a sum bit output from the plurality of sum bit outputs.

17. The method of claim 15 further comprising generating a group propagate and a group generate signals.

18. The method of claim 14 further comprising:

generating an intermediate carry; and processing the intermediate carry.

* * * * *